United States Patent [19]

Nakao et al.

[11] 4,445,474
[45] May 1, 1984

[54] AIR INTAKE SYSTEM FOR SUPERCHARGED AUTOMOBILE ENGINE

[75] Inventors: Masami Nakao; Haruo Okimoto; Yoshikuni Yada; Junki Takeshita, all of Hiroshima, Japan

[73] Assignee: Toyo Kogyo Co., Ltd., Hiroshima, Japan

[21] Appl. No.: 446,700

[22] Filed: Dec. 3, 1982

[30] Foreign Application Priority Data

Dec. 11, 1981 [JP] Japan .................. 56-200733

[51] Int. Cl.³ .................................... F02M 11/04
[52] U.S. Cl. .......................... 123/336; 123/403; 123/341; 261/23 A; 261/DIG. 51
[58] Field of Search ............ 123/320, 336, 403, 401, 123/340, 341; 261/23 A, DIG. 19, DIG. 51; 60/600, 601

[56] References Cited

U.S. PATENT DOCUMENTS

| | | | |
|---|---|---|---|
| 3,796,413 | 3/1974 | Woods | 261/23 A |
| 4,060,062 | 11/1977 | Tsutsui et al. | 261/23 A |
| 4,089,308 | 5/1978 | Pierlot | 261/23 A |
| 4,416,115 | 11/1983 | Iida | 60/600 |

FOREIGN PATENT DOCUMENTS 977777  4/1951  France .................. 123/336

*Primary Examiner*—William A. Cuchlinski, Jr.
*Attorney, Agent, or Firm*—Burns, Doane, Swecker and Mathis

[57] ABSTRACT

An air intake system for a supercharged automobile engine comprises a supercharger disposed on an air intake passage, a primary throttle valve disposed in a primary passage downstream of the supercharger and operatively coupled to an accelerator pedal, a secondary throttle valve disposed in a secondary passage and adapted to be controlled in association with the primary throttle valve, an auxiliary throttle valve in the secondary passage upstream of the secondary throttle valve, and an actuator operable to maintain the secondary throttle valve in a full open position when and so long as the load on the engine is equal to or larger than a predetermined medium load and to gradually open the secondary throttle valve with increase of the suction pressure when and so long as the load on the engine is smaller than the predetermined medium load.

6 Claims, 1 Drawing Figure

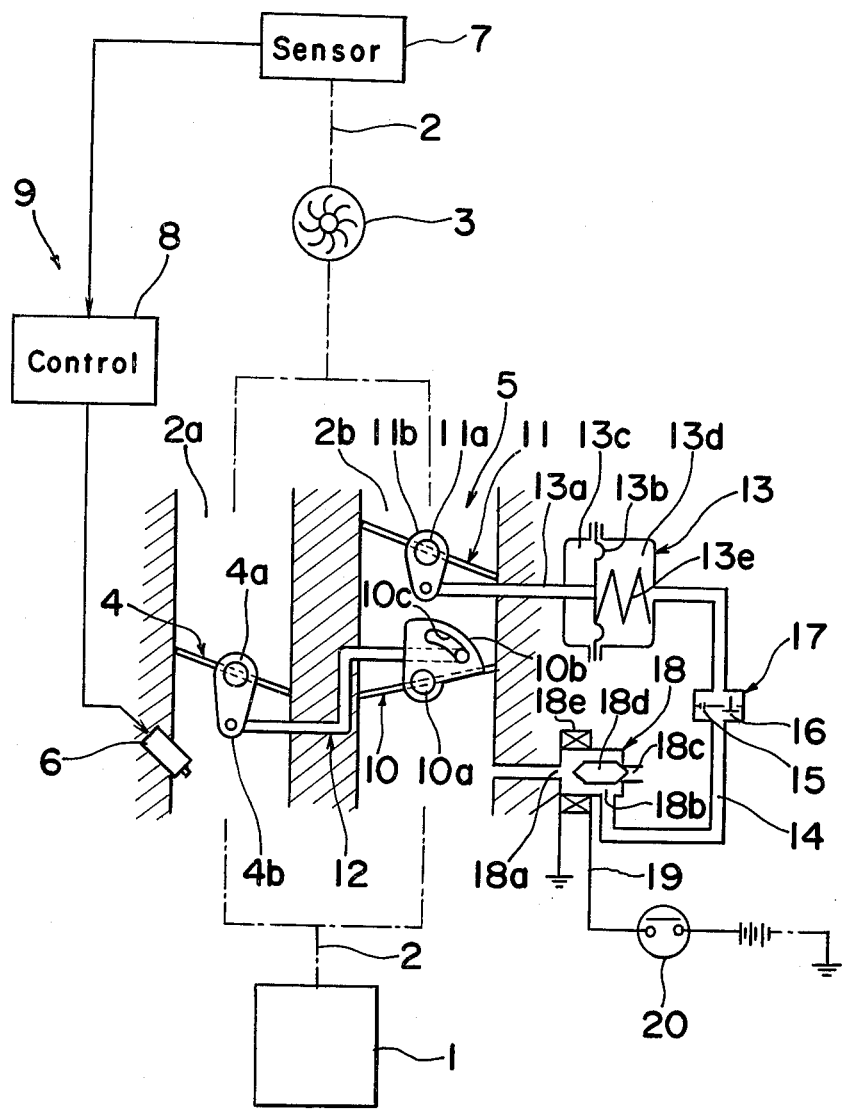

AIR INTAKE SYSTEM FOR SUPERCHARGED AUTOMOBILE ENGINE

BACKGROUND OF THE INVENTION

The present invention generally relates to a supercharged automobile engine and, more particularly, to an air intake system for the supercharged automobile engine of a type having primary and secondary throttle valves downstream of the supercharger.

Hitherto, an air intake system for an internal combustion engine comprising primary and secondary throttle valves disposed in air intake passage means has been known. Such a prior art air intake system is so designed that, while the opening of the primary throttle valve is controlled by an accelerator pedal to which it is operatively coupled, the secondary throttle valve has its opening controlled in dependence on the amount of air being sucked into the engine cylinders to effect a multi-stage control of the amount of the air, thereby improving the metering precision for the amount of the air, the workability of the accelerator pedal during low speed drive, and the negative pressure characteristic of the vacuum hall in the exhaust gas recirculating system and/or the distributor.

However, when it comes to a supercharged internal combustion engine, there is such a limitation that, in order to avoid the possibility that a lubricant oil used to lubricate the supercharger may leak into the air intake passage means under the influence of the negative pressure developed therein during low load operating condition of the engine, the primary and secondary throttle valves must be located downstream of the supercharger with respect to the direction of flow of air or an air-fuel mixture towards the engine cylinder.

In view of the above, in the well known system wherein the secondary throttle is so designed as to be controlled in dependence on the negative pressure developed across the venturi area in the fuel intake passage means upstream of the primary throttle valve. The negative pressure across the venturi area tends to be counterbalanced by the pressure of supercharged air into the fuel intake passage means downstream of the venturi area and, therefore, the secondary throttle valve can hardly be controlled to a proper opening.

Because of the reason which has been stated above, the prior art supercharged automobile engine actually embodied in currently commercially available automobiles employs a linkage type in the air intake system, which linkage type is so designed that, while the primary throttle valve is operatively coupled to the accelerator pedal, the secondary throttle valve is linked to the primary throttle valve so that, when and after the primary throttle valve has been adjusted to a predetermined opening, for example, pivoted about 40° from its substantially closed position towards the full open position, the secondary throttle valve can be forcibly opened. However, this type has been found disadvantageous by the reason which will now be described.

As stated above, in the linkage type, the secondary throttle valve is opened irrespective of the amount of the air being sucked, when and after the primary throttle valve has been adjusted to an opening equal to or greater than the predetermined value. Therefore, during acceleration occurring at the time of start of the automobile, both of the primary and secondary throttle valves are immediately adjusted to the full open position, accompanied by an abrupt increase of the amount of air being sucked. Once this abrupt increase of the amount of the air takes place, the air flow sensor used to detect the flow rate of air in wide range tends to fail temporarily to respond with consequent reduction in follow-up characteristic or consistency of the fuel supply. This in turn results in that the air-fuel mixture being supplied into the engine is unnecessarily leaned to such an extent as to bring about the faltered acceleration and also as to bring about reduction in response to the acceleration, i.e., reduction in acceleration characteristic.

In an attempt to substantially eliminate the above discussed problems, the Japanese Utility Model Application No. 55-79051, filed on June 5, 1980 in the name of the assignee of the present invention and subsequently laid open to public inspection on Jan. 7, 1982 under Laid-open Utility Model Publication No. 57-2225, discloses a similar fuel intake system for a supercharged automobile engine which employs a pressure responsive control such as a diaphragm valve assembly so designed and so positioned as to detect the pressure dominant in the fuel intake passage means downstream of the throttle valve and as to increase the opening of the secondary throttle valve in response to the increase of the detected pressure. While this prior system appears to be satisfactory, a different disadvantage has been found in that, since the positive pressure introduced into one of the working chambers of the diaphragm valve assembly forming the pressure responsive control fails to readily evacuate therefrom during deceleration of the engine and, also, since the pressure of the supercharged air discharged into the fuel intake passage means from the superchargee does not readily fall also during deceleration of the engine because of inertia action of the supercharger, the response of the secondary throttle valve to return towards the closed position during the deceleration of the engine, that is, the response to deceleration, is apt to be adversely affected.

Apart from the above, the Japanese Patent Publication No. 50-12048, published on May 8, 1975, discloses an air intake system specifically so designed as to substantially eliminate the occurrence of the faltered acceleration of the automobile engine. According to this publication, the air intake system comprises primary and secondary intake passages, the primary intake passage having a primary throttle valve disposed therein and adapted to be controlled by the accelerator pedal, whereas the secondary intake passage has a secondary throttle valve and an auxiliary throttle valve both disposed therein with the auxiliary throttle valve positioned upstream of the secondary throttle valve. While the secondary throttle valve is so operatively coupled to the primary throttle valve that, only when and after the primary throttle valve has been opened to a predetermined opening, the secondary throttle valve is opened, the auxiliary throttle valve is eccentrically supported with its pivot axle extending off the center of the auxiliary throttle valve and is normally held in position to close the secondary intake passage by the action of a weight secured to one end of the pivot axle exteriorly of the secondary intake passage.

The auxiliary throttle valve used in the prior art air intake system disclosed in the above mentioned Japanese patent publication is of a type responsive to the negative pressure developed inside the secondary intake passage such that, a predeterminal time after the opening of the secondary throttle valve, that is, when and after the negative pressure developed downstream of the auxiliary throttle valve and upstream of the secondary throttle valve subsequent to the opening of the secondary throttle valve, has attained a magnitude sufficient to overcome the weight acting on the auxiliary throttle valve, the latter is brought in position to open the secondary intake passage. Therefore, the air to be supplied towards the engine cylinder would not be abruptly and prematurely increased substantially simultaneously with the opening of the secondary throttle valve, but the predetermined time after the opening thereof, thereby substantially eliminating the occurrence of the faltered acceleration of the engine which would tend to take place during the acceleration at the time of start of the automobile.

In addition to the substantial elimination of the possible occurrence of the faltered acceleration, this prior art air intake system has an additional advantage in that, since the secondary throttle valve is closed in response to the closure of the primary throttle valve, during the deceleration, a good response to the deceleration can be appreciated.

However, this Japanese patent publication is silent as to the applicability of the air intake system disclosed therein to the supercharged automobile engine. In addition, since this prior art air intake system employs the weight necessary to normally close the auxiliary throttle valve having pressure receiving regions of different surface areas on respective sides of the pivot axle, the auxiliary throttle valve may provide a resistance to the flow of the air to such an extent as to result in reduction of the engine power output in a magnitude corresponding to such resistance, thereby posing a problem.

In addition to the above described problem, the prior art air intake system has an additional disadvantage in that, since both of the secondary and auxiliary throttle valves tend to be readily closed at the time of temporary reduction in load such as occurring during the release of the driver's foot from the accelerator pedal for effecting a gear change, the opening of the auxiliary throttle valve takes place gradually even upon pedaling of the accelerator pedal effected after the gear change and, therefore, the engine power output is apt to be temporarily reduced.

SUMMARY OF THE INVENTION

Accordingly, the present invention has been developed with a view to substantially eliminating the above discussed disadvantages and inconveniences inherent in the prior art air intake systems and has for its essential object to provide an improved air intake system for a supercharged automobile engine which is effective to substantially eliminate the occurrence of the faltered acceleration during the start of the automobile and also to increase the response to the acceleration during a normal drive of the automobile.

Another important object of the present invention is to provide an improved air intake system of the type referred to above, which is effective to substantially eliminate any possible reduction in engine power output which would take place during the temporary reduction in load such as occurring when the gear change is effected.

A further object of the present invention is to provide an improved air intake system of the type referred to above, which is simple in structure and reliable in operation.

According to the present invention, these objects can be accomplished by providing an air intake system wherein throttle valve means disposed in the secondary intake passage is constituted by a secondary throttle valve of link-controlled type and an auxiliary throttle valve of pressure-controlled type such as to make the merits of one of the link-controlled and pressure-controlled types compensate for the demerits of the other of the link-controlled and pressure-controlled types in substantially eliminating the possible occurrence of the faltered acceleration during the start of the automobile and also in increasing the response to the acceleration.

Specifically, the present invention is directed to the air intake system of the type comprising a supercharger disposed on an air intake passage means, a primary throttle valve and a secondary throttle valve means disposed in the air intake passage means downstream of the supercharger. In accordance with the present invention, the secondary throttle valve means is constituted by a secondary throttle valve operatively coupled to the primary throttle valve through a linkage mechanism, and an auxiliary throttle valve adapted to be gradually opened in response to the increase of the pressure of air being sucked when and so long as the load imposed on the engine is smaller than the predetermined value, but to be held in a full open position when and so long as the load on the engine is equal to or greater than the predetermined value. By so constructing, it is possible to make the auxiliary throttle valve govern to control the amount of the air being sucked in dependence on the load on the engine during the acceleration including that at the time of start of the automobile thereby to substantially eliminate any possible occurrence of the faltered acceleration and to increase the response to the acceleration, and also to make the secondary throttle valve govern during the deceleration thereby to increase the response to the deceleration.

BRIEF DESCRIPTION OF THE DRAWING

These and other objects and features of the present invention will readily become clear from the detailed description of the present invention made in conjunction with a preferred embodiment thereof with reference to the accompanying drawing which illustrates, in partially schematic sectional view, an air intake system for a supercharged automobile engine.

DETAILED DESCRIPTION OF THE EMBODIMENT

Referring now to the drawing, an automobile internal combustion engine 1 has an air intake system 2 extending between any known source of air and at least one engine cylinder and having a supercharger 3, which may be either a turbocharger or an air pump driven by the engine 1. A portion of the air intake system 2 downstream of the supercharger 3 with respect to the direction of flow of air towards the engine 1 is comprised of, or otherwise divided into, juxtaposed primary and secondary passages 2a and 2b. The primary passage 2a has a primary throttle valve 4 disposed therein and operatively coupled to any known accelerator pedal (not shown) in any suitable manner for controlling the flow of air therethrough towards the engine 1, and the secondary passage 2b has a secondary throttle valve device 5 disposed therein for controlling the flow of air therethrough towards the engine 1.

The primary passage 2a also has a fuel injection nozzle 6 positioned downstream of the primary throttle valve 4 for effecting a controlled injection of fuel into the passage 2a. For this purpose, there is employed a fuel supply system 9 including an air flow sensor 7 disposed in the air intake system 2 upstream of the supercharger 3 for detecting, and generating an electric signal indicative of, the flow of air being sucked towards the engine 1, which electric signal is supplied to a control unit 8 for controlling the fuel injection nozzle 6 to effect the controlled injection of the fuel into the fuel intake system in an amount appropriate to the detected flow of the air.

As an essential feature of the present invention, the secondary throttle valve device 5 is constituted by a secondary throttle valve 10 and an auxiliary throttle valve 11 positioned upstream of the secondary throttle valve 10. The secondary throttle valve 10 has an axle 10a having one end on which a generally arcuate valve lever 10b is rigidly mounted for movement together with the secondary throttle valve 10. The valve lever 10b has an arcuate slot 10c defined therein and extending a predetermined angle of arc, for example, 40°, about the axle 10a. A link 12 having one end pivotally coupled to a support axle 4a for the primary throttle valve 4 through a valve lever 4b movable together with the primary throttle valve 4 has the opposite end movably engaged in the arcuate slot 10c in the valve lever 10b so that, when and after the primary throttle valve 4 has been pivoted a predetermined angle, for example, 40° in this instance, about the axle 4a from a substantially closed position towards a full open position, the secondary throttle valve 10 can be caused to open. So long as the primary throttle valve 4 has not yet been moved the predetermined angle, the opposite end of the link 12 adjacent the valve lever 10b moves idle within the arcuate slot 10c without causing the secondary throttle valve 10 to open, it being, however, to be noted that, when the primary throttle valve 4 is moved to the full open position, the secondary throttle valve 10 is also held in a full open position.

On the other hand, the auxiliary throttle valve 11 has an axle 11a having one end on which a valve lever 11b operatively coupled to a diaphragm valve assembly 13 for controlling the auxiliary throttle valve 11 is rigidly mounted for movement together with the auxiliary throttle valve 11. The diaphragm valve assembly 13 includes a diaphragm member 13b coupled to the valve lever 11b through a rod 13a, an atmospheric chamber 13c and a working chamber 13d defined by, and on respective sides of, the diaphragm member 13b, and a biasing spring 13e housed within the working chamber 13d. The working chamber 13d is communicated through a pressure sensing passage 14 to a portion of the secondary passage 2b downstream of the secondary throttle valve 10 for introducing the suction pressure, developed inside the secondary passage 2b downstream of the secondary throttle valve 10, into the working chamber 13d. Thus, the displacement of the diaphragm member 13b can be controlled by the difference in pressure between the chambers 13c and 13d and the biasing force of the spring 13e, and this displacement is determinative of the position of the auxiliary throttle valve 11 because the diaphragm member 13b is operatively coupled to the auxiliary throttle valve 11 through the rod 13a and then the valve lever 11b as stated hereinbefore. The diaphragm valve assembly 13 of the above described construction is so designed that, when the above described difference in pressure between the chambers 13c and 13d is higher than the biasing force of the spring 13e, that is, when the load on the engine is smaller than a predetermined value at which the pressure introduced into the chamber 13d is relatively small, for example, when the pressure introduced into the chamber 13d through the passage 14 is within the range of −500 mmHg to −45 mmHg developed during idling, the diaphragm member 13b can be displaced against the spring 13e to bring the auxiliary throttle valve 11 in position to close the secondary passage 2b, but when the difference in pressure described above is lower than the biasing force of the spring 13e, that is, when the load on the engine is equal to or greater than the predetermined value at which the pressure introduced into the chamber 13d through the passage 14 is relatively large, for example, when the pressure introduced into the chamber 13d through the passage 14 is within the range of −45 mmHg to 300 mmHg developed at the time of the maximum load on the engine, the diaphragm member 13b can be biased by the spring 13e to bring the auxiliary throttle valve 11 in position to open the secondary passage 2b.

The pressure sensing passage 14 has a delay unit 17 comprised of a parallel arrangement of an orifice 15 and a check valve 16 operable to permit the relief of the pressure in a direction from the working chamber 13d back to the secondary passage 2b. This passage 14 also has an electromagnetically controlled three-way valve 18 disposed on a position thereof between the delay unit 17 and the opening of the passage 14 into the secondary passage 2b. This three-way valve 18 has a first port 18a in communication with the secondary passage 2b, a second port 18b in communication with the working chamber 13d through the delay unit 17 and a third port 18c in communication with the atmosphere and includes a valve body 18d for communicating the port 18b selectively to the ports 18a and 18c one at a time depending on the position thereof and a solenoid 18e for controlling the position of the valve body 18d. The solenoid 18e is electrically connected to an energizing circuit 19 having a normally opened, engine speed responsive switch 20 adapted to be closed only when the engine speed is equal to or higher than a predetermined speed, for example, 2500 rpm. The three-way valve 18 of the above described construction including the energizing circuit 19 is so designed that, when and so long as the engine speed is lower than the predetermined value with the switch 20 consequently opened, the valve body 18d can be held in position to close the third port 18c and to establish communication between the first and second ports 18a and 18b, but when and after the engine speed has attained a value equal to or higher than the predetermined value with the switch 20 consequently closed, the valve body 18d can be, attracted by the solenoid 18e then energized, held in position to close the first port 18a and to establish communication between the second and third ports 18b and 18c.

The air intake system of the above described construction operates in the following manner. When the primary throttle valve 4 is opened to an opening larger than the predetermined value as a result of the pedaling of the accelerator pedal effected when the engine is desired to be accelerated from the condition in which the load thereon is smaller than the predetermined valve, such as during the acceleration at the time of start of the engine, the secondary throttle valve 10 is forcibly opened by means of the link 12. Although the secondary throttle valve 10 assumes the full open position when the primary throttle valve 4 assumes the full open position, the flow of air towards the engine 1 through the secondary passage 2b is controlled by the auxiliary throttle valve 11 is such a way as to increase it with increase of the pressure of the air being sucked, that is, with the increase of the load on the engine, because the opening of the auxiliary throttle valve 11 takes place delayed a certain time subsequent to the opening of the secondary throttle valve 10. By so doing, the air-fuel mixing ratio of the combustible air-fuel mixture supplied into the engine 1 can advantageously be adjusted to a proper value with no reduction in follow-up characteristic of the fuel and, accordingly, not only can any possible occurrence of the faltered acceleration be substantially eliminated, but also the response to the acceleration can be increased.

During the normal acceleration while the load on the engine is equal to or larger than the predetermined value, the secondary throttle valve 10 is opened accompanied by the opening of the primary throttle valve 4 and, on the other hand, the auxiliary throttle valve 11 is held in the full open position. Therefore, the auxiliary throttle valve will not provide any resistance to the flow of the air being sucked and, accordingly, the amount of the air being sucked can be controlled to a value appropriate to the load with the consequence of the increased response to the acceleration during the normal acceleration.

On the other hand, during the deceleration of the engine, since while the auxiliary throttle valve 11 is in the full open position the secondary throttle valve 10 is closed accompanied by the closure of the primary throttle valve 4 as a result of the release of the pedaling force which has been applied to the accelerator pedal. The control of the amount of the air being sucked through the secondary passage 2b is governed by the secondary throttle valve 10 and, accordingly, the amount of the air being so sucked can be throttled in good response with the consequence of the increased performance of the engine during the deceleration. It is to be noted that, since the delay unit 17 is of a construction wherein the direction of closure of the auxiliary throttle valve 11 can readily be performed by the action of the check valve 16, in the case where the engine is again accelerated from the decelerated condition which has taken place with the load smaller than the predetermined value, the auxiliary throttle valve 11 is readily closed in a manner similar to the secondary throttle valve 10 during the deceleration, and any possible occurrence of the faltered acceleration can be avoided during the re-acceleration as is the case with that during the acceleration at the time of the start.

Furthermore, in the embodiment described above, since when the engine speed is equal to or higher than the predetermined value, the electromagnetically controlled three-way valve 18 is activated to close the first port 18a and to establish communication between the second and third ports 18b and 18c, the closure of the auxiliary throttle valve 11 which would occur at the time of temporary reduction in load such as occurring at the time of the gear change can be avoided, thereby avoiding any possible temporary reduction in power output which would occur subsequent to the gear change.

As herein before described, since the present invention is such that the secondary throttle valve is linked to the primary throttle valve while the auxiliary throttle valve is so designed as to gradually open with increase of the suction pressure when and so long as the load on the engine is smaller than the predetermined value and as to be maintained in the full open position when the load on the engine becomes equal to or larger than the predetermined value, not only can any possible occurrence of the faltered acceleration be avoided during the acceleration at the time of the start with no slightest reduction in decelerating performance, but also a good accelerating performance can be obtained with the increased response to the acceleration.

Although the present invention has fully been described in connection with the preferred embodiment thereof with reference to the accompanying drawings, it is to be noted that various changes and modifications are apparent to those skilled in the art. By way of example, although the opening of the pressure sensing passage 14 remote from the three-way valve 18 has been described as opening into the secondary passage 2b downstream of the secondary throttle valve 10, it may be opened into the primary passage 2a downstream of the primary throttle valve 4.

Accordingly, such changes and modifications are to be understood as included within the scope of the present invention unless they depart therefrom.

We claim:

1. An air intake system for a supercharged internal combustion engine having a supercharger disposed on an air intake passage means, which system comprises, in combination:
   primary and secondary passages formed in a portion of the air intake passage means downstream of the supercharger;
   a primary throttle valve disposed in the primary passage and operatively coupled to an accelerator pedal such that the selective opening and closure of said primary throttle valve can be controlled by the accelerator pedal;
   a secondary throttle valve disposed in the secondary passage and operatively coupled to the primary throttle valve through a linkage mechanism;
   an auxiliary throttle valve disposed in the secondary passage; and
   an actuator for controlling the selective opening and closure of the auxiliary throttle valve in dependence on the suction pressure of air being sucked at a position downstream of the primary throttle valve or the throttle valves in the secondary passage, said actuator including means operable to gradually open the auxiliary throttle valve with increase of said suction pressure when and so long as the load on the engine is smaller than a predetermined medium load and to maintain the auxiliary throttle valve in a full open position when the load on the engine is equal to or larger than the predetermined medium load.

2. A system as claimed in claim 1, wherein said actuator comprises a diaphragm device adapted to be operated by the pressure inside the air intake passage means downstream of the throttle valves and including a spring which is caused to be in a full stroke by the suction pressure when the load on the engine is equal to or larger than the predetermined medium load, and a delay unit disposed on a pressure passage for the transmission of the pressure to the diaphragm device and operable to gradually open the auxiliary throttle valve.

3. A system as claimed in claim 1, wherein said actuator also includes means for holding the auxiliary throttle valve in the full open position when the engine speed is higher than a predetermined value.

4. A system as claimed in claim 2, wherein said actuator also includes means for holding the auxiliary throttle valve in the full open position when the engine speed is higher than a predetermined value.

5. A system as claimed in claim 4, wherein said means operable to hold the auxiliary throttle valve includes a valve operable in response to a signal from an engine speed sensor switch for introducing the atmospheric pressure to a pressure chamber of the diaphragm device.

6. A system as claimed in claim 2, wherein said delay unit includes a one-way valve for effecting a ready closure of the auxiliary throttle valve.

* * * * *